United States Patent
Fritsch

(10) Patent No.: US 9,482,560 B2
(45) Date of Patent: Nov. 1, 2016

(54) OPTICAL POSITION TRANSMITTER WITH ANALOG MEMORY UNIT

(71) Applicant: HEXAGON TECHNOLOGY CENTER GMBH, Heerbrugg (CH)

(72) Inventor: Robert Fritsch, Balgach (CH)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 0 days.

(21) Appl. No.: 14/412,641

(22) PCT Filed: Jul. 4, 2013

(86) PCT No.: PCT/EP2013/064169
§ 371 (c)(1),
(2) Date: Jan. 2, 2015

(87) PCT Pub. No.: WO2014/006147
PCT Pub. Date: Jan. 9, 2014

(65) Prior Publication Data
US 2015/0144774 A1    May 28, 2015

(30) Foreign Application Priority Data

Jul. 4, 2012 (EP) .................................. 12174944

(51) Int. Cl.
*G01D 5/34* (2006.01)
*G01D 5/26* (2006.01)
(Continued)

(52) U.S. Cl.
CPC ............ *G01D 5/262* (2013.01); *G01D 5/26* (2013.01); *G01D 9/30* (2013.01); *G01B 5/008* (2013.01)

(58) Field of Classification Search
CPC .................................................... G01D 5/347

USPC ........................................ 250/231.13–231.19
See application file for complete search history.

(56) References Cited

U.S. PATENT DOCUMENTS

| | | | |
|---|---|---|---|
| 4,287,441 A | 9/1981 | Smith | |
| 4,330,796 A | 5/1982 | Anagnostopoulos et al. | |

(Continued)

FOREIGN PATENT DOCUMENTS

| | | |
|---|---|---|
| DE | 31 00 550 A1 | 1/1982 |
| DE | 38 78 297 T2 | 3/1993 |

(Continued)

OTHER PUBLICATIONS

European Search Report dated Dec. 3, 2012 as received in Application No. 12 17 4944.

(Continued)

*Primary Examiner* — Thanh Luu
(74) *Attorney, Agent, or Firm* — Maschoff Brennan

(57) ABSTRACT

The invention relates to a position transmitter with a position code and an optical sensor element for detecting at least one part of the position code. The sensor element has a row of photosensitive detection regions, which convert incident photons into electric charges, and a readout structure for outputting an electric data signal corresponding to the stored electric charges. The sensor element has an analog memory unit structure with a number of N>1 rows of photo-insensitive analog memory cells in order to temporarily store the electric charges and an electric switching structure, by means of which a charge transfer can be carried out between the detection regions and the memory cells, between the memory cells amongst one another, and between the memory cells and the readout row.

21 Claims, 8 Drawing Sheets

(51) Int. Cl.
*G01D 9/30* (2006.01)
*G01B 5/008* (2006.01)

(56) References Cited

U.S. PATENT DOCUMENTS

| | | | |
|---|---|---|---|
| 5,033,096 | A | 7/1991 | Morrison et al. |
| 5,402,582 | A | 4/1995 | Raab |
| 5,483,058 | A | 1/1996 | Leviton |
| 5,848,188 | A | 12/1998 | Shibata et al. |
| 6,246,050 | B1 * | 6/2001 | Tullis .............. G01D 5/347 250/231.13 |
| 7,051,450 | B2 | 5/2006 | Raab et al. |
| 7,069,664 | B2 | 7/2006 | Raab et al. |
| 7,315,329 | B1 | 1/2008 | Yoshihara |
| 8,242,434 | B2 | 8/2012 | Lippuner |
| 2003/0058355 | A1 | 3/2003 | Wong et al. |
| 2008/0181001 | A1 | 7/2008 | Shalvi |
| 2012/0081590 | A1 | 4/2012 | Nelson et al. |

FOREIGN PATENT DOCUMENTS

| | | |
|---|---|---|
| DE | 11 2006 003 663 T5 | 12/2008 |
| EP | 1 474 650 B1 | 11/2004 |
| EP | 1 890 113 A1 | 2/2008 |
| EP | 2 533 022 A1 | 12/2012 |
| WO | 95/32579 A1 | 11/1995 |
| WO | 2004/094957 A1 | 11/2004 |
| WO | 2007/132453 A2 | 11/2007 |
| WO | 2008/019855 A1 | 2/2008 |
| WO | 2010/139964 A2 | 12/2010 |
| WO | 2012/054095 A1 | 4/2012 |

OTHER PUBLICATIONS

"CCD structures implemented in standard 0.18 mm CMOS technology" by P.R. Rao, X. Wang and A.J.P. Theuwissen in "Electronics Letters", vol. 44, No. 8, Apr. 10, 2008.

* cited by examiner

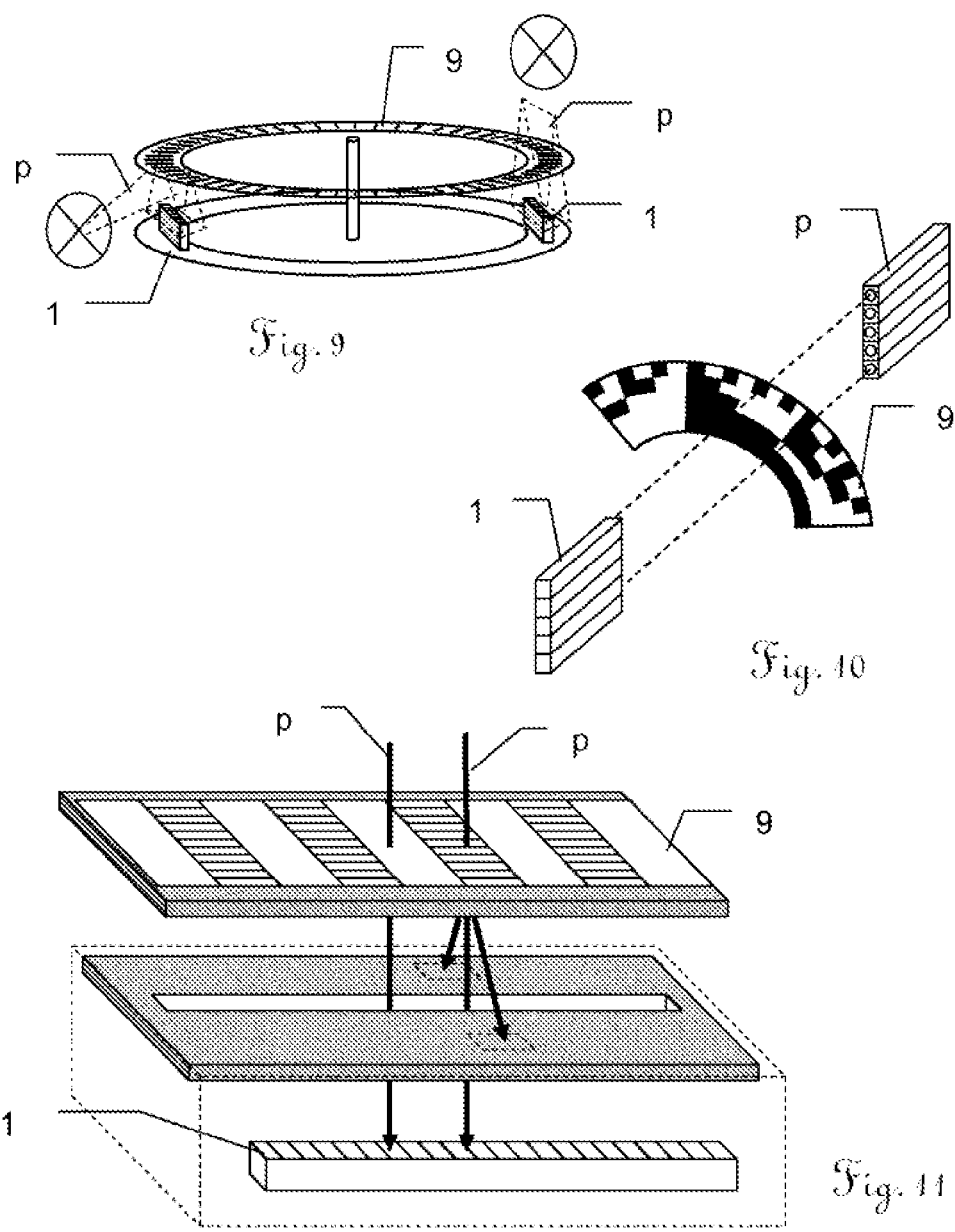

OPTICAL POSITION TRANSMITTER WITH ANALOG MEMORY UNIT

FIELD OF THE INVENTION

The invention relates to a position encoder comprising a sensor element with an analog memory.

BACKGROUND

Specifically, the invention relates to the technical field of position encoders, in which, for the purposes of determining the position, a position code is acquired by a sensor element, as are used in various applications for determining lengths and/or angles in one or more dimensions. Some exemplary embodiments are found in e.g. U.S. Pat. No. 5,402,582, EP 1 474 650, U.S. Pat. Nos. 7,051,450 or 7,069,664, wherein a sensor element described in the present invention is also applicable in embodiments of position encoders with different designs, in which, within the scope of determining the position, an optical acquisition of a position or location code (or at least of part of such a code) is performed.

Very different approaches are known for acquiring the position code, for example imaging, shadow casting, projection, reflection, interference pattern formation, external or internal illumination of the code, or autoluminous or fluorescing code patterns, etc. Electromagnetic waves, specifically electromagnetic radiation in the optical wavelength range are used for preferably contactless transmission of a code pattern to the sensor element. The code in this case may be embodied in an incremental manner, in an absolute manner or in a mixed form, for example absolute within only part of the measurement range or incremental within absolute encoded regions. Examples for this can be found in e.g. WO 2008/019855, WO 2010/139964, DE 11 2006 003 663 or WO 2004/094957.

In general, there is an acquisition in this case of at least part of a position code by a sensor element which comprises a plurality of active acquisition regions. These acquisition regions separately acquire sub-regions of this code part. The acquisition regions can be embodied as discrete, separate portions which are arranged at dedicated positions, for example in a row or in a two-dimensional matrix. The acquisition regions (pixels) are strung together here in a continuous, substantially uninterrupted arrangement, i.e. as a continuous or quasi-continuous arrangement of photosensitive regions. Here, a quasi-continuous arrangement of photosensitive regions is a stringing together with—compared to their respectively active sensor area—only small spaces therebetween, for example as is conventional in the case of known CCD line or CCD area sensors.

However, the arrangement of the photosensitive regions can also be embodied in a continuous manner, i.e. without spacing between the pixels, wherein a photon which impinges in an intermediate region between two pixels is assigned to one or the other pixel with a certain probability. The geometric arrangement of the acquisition regions can also be specially adapted to the code to be acquired or it can be masked accordingly, for example by sensors arranged in accordance with the code pattern to be acquired or by masking the acquisition regions such that the sensitivity thereof is restricted to a desired surface region. Thus, in addition to the most common, linear arrangement, the geometric arrangement of acquisition elements can by all means also be bent. By way of example, a row or matrix of acquisition elements can be arranged not only as a line or rectangle, but also in the form of a circular arc, in an angled manner or with any curve form, or else along a spherical surface, etc.

At least a portion of the code is acquired by the sensor element at a predetermined time in the case of position measurements, especially in the case of highly precise position measurements. Very high position accuracies are realizable, especially by an evaluation of the acquired code section with a sub-pixel resolution. In addition to the achievable position resolution when acquiring the code, setting the acquisition time precisely can, in this case, also have a significant influence on the achievable accuracy of the measurement system operated therewith, especially if a plurality of geometric dimensions are acquired by a plurality of position sensors and these dimensions are subsequently linked to one another, for example for determining a multi-dimensional location of an object. The exact time of the position acquisition is also important in the case of measurements during a movement of the object to be measured, i.e. in the case of a position that changes in time. Especially in the case of high position resolutions, for example of the order of a few micrometers or seconds of arc or even higher resolution, very small movements—as occur due to e.g. vibrations, oscillations, trembling of the user, etc. —are already acquirable by the position encoders.

Therefore, the measurement value acquisition is often triggered by means of a trigger signal, which defines the desired time of the acquisition of the position value. By way of example, one flank of an electric signal can be used for triggering the measurement value acquisition. In the process, it is possible to apply event-based triggering, in the case of which the measurement is triggered by an external event. It is also possible to apply triggering by an internal or external clock signal, which is optionally synchronized over a plurality of sensors. By way of example, it is possible in this case to perform synchronous determination of position values from a plurality of—also spatially distributed—position encoders and the measurement data thereof can subsequently be linked so as to determine a multi-dimensional spatial location therefrom. A cyclical readout of actual value signals, afflicted by small temporal jitter, from position encoders may also be required, for example for actual value signals in a temporally discrete regulation of a positioning unit. A further example of a special embodiment is described in e.g. EP 2 533 022.

An application example in which high precision of the position determination is required includes surveying devices (for example geodetic instruments or coordinate measuring machines). Ever higher demands are placed on the position measurement accuracy in the case of production machines (e.g. pick & place machines, laser cutting machines, grinding machines, lathes, milling machines, etc.) as well. In the process, the determined position can, in particular, be formed by linear positions, rotary positions or combinations thereof. Highly synchronous measurement value acquisition may also be required in monitoring and diagnostic systems, for example in the one from the patent application PCT/EP2012/054095.

In position sensors in the prior art, an illumination state of the sensor element is acquired at the time of the occurrence of the trigger signal, which illumination state is then clocked out pixel-by-pixel—usually serially by a single channel only. Only once all pixels have been clocked out can there be renewed further triggering by a trigger signal and an acquisition of the current code region by the sensor element.

Therefore, a new measurement is only possible again once the previous measurement value has been read out completely.

Since such a sequential readout of a CCD chip requires a non-negligible amount of time, the achievable readout rates are usually comparatively low and consequently there is also a minimum limit for the time between two successively occurring acquisitions. This is true especially if there is, in addition to the pixel-by-pixel clocking out of the CCD, an analog-to-digital conversion of each pixel value, which is possibly just as time-consuming. By applying a so-called "pipelined" A/D conversion, at least the conversion time of the digitization can, in the process, be reduced or even completely avoided except for a remaining latency time. The clocking out limits the maximum achievable measurement rate of such a sensor and consequently also influences the minimum admissible time duration between two trigger events, during which a complete acquisition of two values of the illumination state, and hence of the position code values, is possible. Although an approximation of the measurement value to the position actually present at the trigger time can be obtained here by temporal interpolation or extrapolation between two or more measurements, an actual acquisition of a measurement value at the trigger times is, however, not possible.

A solution for increasing the readout rate in CCDs, known from e.g. U.S. Pat. No. 4,330,796 or US 2012/081590, lies in so-called framing, in which it is not always the whole CCD structure but only a currently relevant portion thereof, which is also referred to as ROI (abbreviation for "region of interest"), that is read out; this is possible in a correspondingly shorter amount of time. A reduced readout time can also—to the detriment of the position resolution—be obtained by binning, wherein this technology is usually used primarily for increasing the light sensitivity, which, in the case of position encoders, is usually of subordinate importance since well-defined or even adjustable illumination conditions usually prevail in the position encoder, where there is artificial illumination and a housing sealed in relation to an external light influences. In the case of such encapsulated position encoders, it is possible, for example, also to obtain an exposure control by an appropriate actuation of the light source, especially by adjusting the intensity and/or luminous duration of the light emission. By way of example, local smearing of a code image on a sensor element can be avoided or reduced by means of short-term illumination (e.g. in the form of a light flash in the nanosecond range or shorter), which may be of importance, especially in the case of dynamic movements.

The linear or area sensors used in the prior art comprise either an analog or a digital interface. By way of example, analog optical sensor elements according to the CCD principle have lines of photosensitive pixels which convert incident photons into electrical charges. Depending on the design of the semiconductor structure, these can be embodied as front-side illuminated CCDs or back-side illuminated CCDs. These charges are collected in the semiconductor structure in so-called potential wells and then shifted as analog charges to an output (=clocking out), where the collected charges of each individual pixel are successively converted into a voltage proportional to the amount of charge or conversion into a digital value corresponding to the number of charge carriers takes place. This clocking out is brought about by shifting the potential wells with the charges contained therein in the direction of the output, in the style of a linear shift register (also referred to as a bucket brigade), for which various technologies (e.g. by two-phase, three-phase or four-phase clocking out) are known.

In order to reduce blooming and/or smearing effects, CCDs are known which operate according to the frame or interline transfer principle, or according to a combination of these two principles. In these, the charges are, after defined exposure time, transferred into a darkened semiconductor region from which they are then read out.

By way of example, in the case of television cameras, area CCD chips are known, in which a shift of the charges from the photosensitive area takes place in a non-photosensitive component region (e.g. a component region masked in an optically opaque manner), which is carried out on a first side in the case of even-numbered lines and on a second side in the case of odd-numbered lines. As a result of such a split to two sides, video images can advantageously be read out using the line-jump method by virtue of there being a separate readout of even and odd lines, as is described in e.g. U.S. Pat. No. 7,315,329.

In slow-motion technology, so-called high speed cameras, by means of which frame recording rates with a large number of frames per second are to be obtained, as described in e.g. US 2003/0058355, also operate according to a similar principle. In these, the photo-induced charges are sequentially shifted to a plurality of different transfer registers, to which the time-consuming readout (and digitization) process is then applied independently in each case, that is to say, so to speak, in parallel. The required high frame rates can be achieved by this multiple, parallel readout, as a result of which the limitation from the readout time of an individual image can be circumnavigated. However, this is accompanied by the disadvantage that this requires a corresponding multiple of chip area for the transfer arrays and a plurality of output stages.

In addition to the CCD technology, photosensitive sensors can also be embodied with a digital interface, for example as sensors using CMOS technology. Here, respectively one evaluation circuit, which performs an analog-to-digital conversion on each pixel sensor internally, buffers this digital information and provides it for the readout, can be assigned to each acquisition region of the sensor. Here, buffering occurs by means of a digital memory for the digital values. Although the time for serial clocking out of each individual line can be avoided by the parallel readout, the time for the conversion of the charges into a voltage signal and, onward, into a digital signal and the time for the sequential readout of the digital values remains and limits the maximum possible trigger rate, in particular if the conversion is not completely pipelined.

There are also approaches relating to sensors which attempt to unify the advantages of CCD sensors and CMOS sensors, as is described, for example, in "CCD structures implemented in standard 0.18 mm CMOS technology" by P. R. Rao, X. Wang and A. J. P. Theuwissen in "ELECTRONICS LETTERS", volume 44, number 8, dated Apr. 10, 2008. However, the complicated manufacturing processes required in the process are only mastered by very few producers and the advantages obtainable thereby often do not justify the increased process complexity during the production.

SUMMARY

Some embodiments of this invention lie in improving a position encoder, especially a position encoder comprising an optical sensor element, in particular a position sensor which is highly precise in relation to the measurement time and the position resolution.

Some embodiments in improving the behavior of a position encoder in the case where trigger signals for measurement value acquisition follow one another in quick succession.

Expressed differently, some embodiments of this invention provide a position encoder comprising an optical sensor element for acquiring a position code, in which the time of the position code acquisition can be set very precisely by a trigger signal and by means of which the position code remains individually acquirable for each of these trigger times, even in the case of a plurality of trigger signals following one another in quick succession.

Some embodiments provide an advantageous actuation of an optical sensor element for a trigger-based position code acquisition.

Large-scale industrial producibility and a miniaturization and cost reduction of the position encoder is a further embodiment.

Here, the provision of a code acquisition element for a highly precise position sensor, which enables a trigger-based code acquisition, even within a short time frame, is also a further embodiment of this invention, wherein, in particular, the provision of a corresponding actuation method and the associated actuation structure of the code acquisition element is also a continuing part of the embodiment.

In the following, the invention will be explained in an embodiment of a one-dimensional line sensor. However, it is clear to a person skilled in the art that the invention can also be applied in a similar manner to position encoders which are equipped with a plurality of photosensitive point sensors which are not arranged in an at least approximately continuous, straight line of acquisition regions, i.e. necessarily form a continuous line.

A position encoder according to the invention comprises a position code and an optical sensor element for acquiring at least part of the position code. Here, the sensor element has a line of photosensitive acquisition regions, which convert incident photons into electric charges, and a readout structure for outputting an electric data signal corresponding to the stored electric charges. The readout structure can perform a line-by-line (=parallel) or element-by-element (=serial) readout process.

According to the invention, the sensor element, for the purposes of temporarily storing the electric charges, comprises an analog memory structure with a number of N>1 lines of photo-insensitive analog memory cells, and an electrical switching structure, by means of which a charge transfer is performable between the acquisition regions, the memory cells and the readout line. In particular, the charge transfer between the acquisition regions, the memories and the readout structure can be brought about line-by-line in this case.

Expressed differently, the invention relates to a position encoder with a photosensitive sensor array which can buffer a plurality of values of illumination states in the sensor in analog and in quick succession such that a plurality of measurements can be performed and buffered within short time intervals, which measurements can only be read out at a later time. Here, the readout duration in particular may also be longer than the short time intervals between the measurements. Here, triggering of the acquisition of the values of illumination states can be triggered by an electric trigger signal.

The switching structure can be embodied in such a way that a time of acquisition of the position code and of transfer of the charges from the acquisition regions into the memory structure can be determined by a trigger signal and a time of output by the readout structure can be determined by a readout signal asynchronous to the trigger signal—i.e. time independent from the trigger signal.

The invention also relates to a position encoder in which the sensor element for temporarily storing the electric charges is embodied an analog memory structure with a number of N>1 lines of photo-insensitive analog memory cells. Here, the number of memory cells is greater than, in particular a multiple of, the number of acquisition regions. Here, the sensor element comprises an electrical switching structure by means of which a charge transfer is performable between the acquisition regions, the memory cells and the readout structure and which is embodied in such a way that the charge transfer between the lines of memory cells is performable for individual lines or for a subset of the lines in the memory structure. In particular, an upper part of the lines in the memory structure can be shiftable independently of a lower part of the lines in the memory structure in this case.

Here, an embodiment of the position encoder can comprise a single line of photosensitive acquisition regions, a single readout structure and at least $N≥2$, in particular $N≥4$, lines of memory cells.

Here, the switching structure renders possible performing the transfer of electric charges
- between the line of acquisition regions and one of the lines of analog memory cells—at an acquisition time predetermined by the trigger signal, and
- between the lines of analog memory cells amongst themselves, in particular wherein the transfer is individually or selectively actuatable for each one of these lines or for a proper subset (as a definable subset) of the number of the lines of the memory structure, and
- between at least one of the lines of analog memory cells and the readout structure—by the readout signal for reading out the position code acquired at the associated trigger time.

Here, at least a second acquisition is thus performable between a first acquisition and completion of an associated first readout of the first acquisition, the charges of which second acquisition are temporarily stored in the memory structure in analog manner and which can be read out at a later time in an at least second readout following the first readout. Therefore, a second trigger is already possible before completing the first readout. As a result of the application according to the invention of analog memories, a very quick succession of a plurality of triggers is possible (provided that the memory structure comprises free memory lines), which is independent of the readout duration.

The sensor element can comprise a discharge structure, which is embodied in such a way that charges possibly present in one of the analog memory cells can be discharged before there is a charge transfer into these memory cells. Here, the discharge structure can be applicable not only to all the lines, but, in particular, selectively to a subset of the number N of lines of the analog memory structure, specifically to individual lines of the memory structure.

The memory structure or the actuation logic unit thereof can comprise a memory manager, which controls the charge transfer on the basis of the trigger signal and of the readout signal. Here, this memory manager can be embodied in such a way that, on the basis of the readout signal, there is a transfer, i.e. shifting, of the charges in the memory structure in the direction of the readout structure and the output of the data signal by the readout structure on the basis of the analog memory values take place. At the same time, the memory manager can be embodied in such a way that, on the basis of the trigger signal, a transfer, i.e. a shift, of the charges from the acquisition regions into the memory structure takes place. Specifically, this shift can be effected into a line in the memory structure which lies closest to the readout structure and in which no charges of previous triggers are stored yet. To this end, the memory structure is embodied in such a way that not only the totality of the memory structure is shiftable line-by-line, but that also only portions or individual lines of the memory structure are shiftable in a selective manner. Here, these two functions of the memory manager can be executed independently of one another (except for trivialities), i.e., in particular, the output can be effected asynchronously in relation to the trigger.

The sensor element can be installed with a CCD with a CMOS structure on a common semiconductor substrate. Here, in particular, the memory structure can be embodied in CCD technology and the readout structure can be embodied in CMOS technology.

The sensor element can be embodied with a correlated double sampling (CDS) structure. In particular, this can be embodied in that line of the memory structure from which the transfer into the readout structure is effected (or in the readout structure itself).

The line of acquisition regions can comprise at least one dark pixel, which is protected against incident photons and in which no charges are generated by photons. The charges (in particular parasitic charges) of this dark pixel are also transferred during the line-by-line transfer as a dark reference. The dark reference can be used for improving the measurement signals, in particular within the scope of the aforementioned CDS.

In addition to this first step, by means of which an improvement of the sensor can be achieved in relation to the trigger requirements in a position encoder, the above-described sensor according to the invention and the actuation thereof can, in addition to the application in the above-described form, also still be improved in respect of the obtainable signal quality within the scope of a further step. An above-described sensor according to the invention is applicable in many applications—even without the development explained below, which, by all means, can be considered to be an independent invention—but it can be optimized further, as the following development-embodiment explains.

Especially as a result of the trigger-based actuation according to the invention, leakage charges (e.g. thermally generated electrons, . . . ) may collect in the analog memories (both in the memories used by previously acquired photo-charges and in the unused memories) during relatively long periods of time without a trigger, which charges accumulate with the photo-induced charges actually to be read out and adversely affect or falsify the evaluation result. Moreover, as a result of the lack of fixed cycle time of the shift and of the readout of the lines in the case of an acquisition based on an external, asynchronous trigger, the respectively prevalent conditions prior to each readout are no longer necessarily the same, as is the case for e.g. constant readout rates. By way of example, fewer thermal charges are generated between two triggers following one another in quick succession than in the case of trigger signals with a relatively long time interval therebetween. In the fixed frame rate of the readout applied in the prior art, the conditions in the sensor are virtually the same for two successive readouts, as a result of which e.g. a mean dark value can be subtracted from the measurement values or other types of averaging are applicable for improving the signal quality and for reducing noise.

Further improvements according to the invention are obtainable here as a result of a reset strategy, adapted to these discoveries, of the memories and an appropriate actuation or reset structure for the memory cells.

Thus, for example, the empty or unused memory cells, which do not contain any read photo-charges, can respectively be reset to a well-defined value prior to the shift of photo-charges therein by virtue of parasitic charges, possibly collected therein, being discharged.

By way of example, such a reset can be brought about by virtue of unused memory cells always having a potential drop to a discharge channel (scavenger, gutter), which is only lifted prior to the transfer of the charge into the respective cell. To this end, an appropriate reset structure for the memory, which is actuated accordingly by an actuation circuit, may be provided in the semiconductor.

Alternatively or additionally, it is also possible for one or more dark pixels to be co-shifted together with the photo-charges in each case. The charges collected in said dark pixel(s) can be used as a reference value for the dark value during the evaluation and, for example, be subtracted from the measurement values; this corresponds to the principle of correlated double sampling.

In addition to the hardware optimizations, a numerical improvement can also be obtained by virtue of, for example, the temperature of the sensor being determined and the thermally generated amount of charge to be expected statistically being calculated on the basis thereof and on the basis of the time between photo-generation of the charges and the readout thereof, which is based on a numerical model of the semiconductor, which thermally generated amount of charge can then be compensated for numerically within the scope of the evaluation.

In order to discharge those charges which are generated between two trigger events by the incident photons, it is also possible to use so-called trash lines in the memory, into which the previously collected charges are discharged upon triggering in order to obtain a defined state of the photocell for the measurement value at the trigger time. It is only after the exposure period that the actual measurements charge is shifted into the next memory line. Here, during readout, only the memory lines with the measurement values are read out; the charges in the trash lines need not necessarily be read out but can be discharged directly without being read out. In order to avoid an overflow of charges from illuminated photocells into other chip regions in the case of a relatively long absence of a trigger signal, provision can be made for so-called overflow drains which discharge charge carriers in a targeted manner before these run the risk of undesirably overflowing into adjacent pixels or memory cells when saturation is obtained—this is similar to what is known for avoiding smear effects in photographic sensors. Although such a trash line principle accordingly requires a greater number of memory lines, which do not contribute to determining the position, this allows the application of a homogeneous, easy to handle semiconductor structure.

Alternatively, a dedicated structure, in particular in the case of the photocells, may be provided for discharging charges between the trigger events, which dedicated structure for example shifts the charges to be determined in a first direction (e.g. downward, i.e. in the direction of the and readout line) into the memory structure upon triggering. However, without triggering, the undesired charges are shifted in a second direction (e.g. upward)—to a discharge structure.

By way of example, in one embodiment, direct discharging of the charges from the photocells (and possibly also in at least the first memory cell) can be performed during the time when no trigger signal occurs. A potential barrier is built up in respect of this discharge with the occurrence of a trigger signal, which potential barrier is maintained for an exposure time—which may also be designed in an adjustable manner—such that the photo-charges are collected. These photo-charges are shifted toward an unused memory cell by means of a potential drop. Following this, a potential drop is, in turn, established from the photocell to the discharge structure. The photo-charges are shifted toward the readout structure depending on the occupancy state of the analog memory structure—i.e. depending on in which of the memory lines acquired photo-charges are stored and in which they are not. Here, at least one dark pixel can also be co-shifted in each line, which dark pixel does not contain photo-charges but only collected parasitic charges. By taking into account the charge value of this dark pixel or pixels during the evaluation, it is possible to at least partly compensate for many parasitic effects, as described, for example, also in e.g. US 2012/0081590 or elsewhere.

The invention also relates to a method for optical acquisition of at least part of a position code by a line of photosensitive acquisition elements, wherein the method performs an acquisition and conversion of photons into electric charges in the acquisition regions and an output—triggered by a readout signal—of an electric data signal corresponding to the electric charges in a readout structure.

According to the invention, in this case, triggered by the trigger signal, shifting the electric charges from the acquisition regions into a memory structure with N>1 lines of analog memory cells, and temporary buffer storing of the analog charges in this memory structure prior to these being output by means of the readout structure.

Here, as a result of the buffer storing, the acquisition can be effected asynchronously in relation to the output, in particular controlled by two independent actuation signals.

By means of a switching structure, the method can perform—caused by a trigger signal—a shift of the charges from the line of photosensitive acquisition regions into one of the lines of the analog memory structure. Furthermore, by means of the switching structure, the method can perform—caused by a readout signal—a shift of charges from one of the lines in the analog memory structure into a readout structure and an output of the electric data signal from the readout structure.

Here, the shift conditional on the trigger signal can be effected together with an advance of lines in the memory structure in the direction of the readout line, especially of those lines in the memory structure in which acquired charges are buffer stored. As a result of this advance, the switching structure is embodied in such a way that the shift in the memory structure can be performed selectively for individual lines or groups of lines in the memory structure while other lines in the memory structure are not displaced. Here, a selection of a subset of a plurality of lines in the memory structure may also be shifted together for advance purposes, while other, already occupied lines in the memory structure are not shifted.

The method can perform temporary buffer storing of the analog charges in the memory structure prior to the output with a selective transfer of individual lines or a subset of the lines in the memory structure. Here, in particular, an upper part of the lines in the memory structure can be shiftable independently of a lower part of the lines in the memory structure, wherein, as a result of the buffer storing, the acquisition can be effected asynchronously in relation to the output.

Here, the readout signal is controllable in a time independent manner in relation to the trigger signal. Therefore, the two signals may be asynchronous in relation to one other.

In a special embodiment, the method can manage the memory structure as a line-by-line shift register, in particular according to a first in, first out principle. During the management, there can be carried out, in particular, selective erasing and shifting of a subset of the lines in the memory structure. Specifically, there can be selective erasing of this target line here prior to the shifting of charges into a target line of the memory structure.

In one embodiment, the method according to the invention can, depending on the trigger signal, the charges from the acquisition regions are either
  discharged in a discharge structure or
  stored in the analog memory structure.

Here, charges in the memory structure can be shifted into that unoccupied line lying closest to the readout structure. The charges from the photo-line are thus shifted, e.g. selectively, line-by-line in the direction of the readout structure until these have advanced to directly in front of that already occupied line in which charges of a preceding acquisition are already stored.

Thus, in the process, the already occupied lines of the memory structure are not shifted in a manner dependent on the trigger signal.

Triggered by the trigger signal, the method according to the invention can perform
  a shift of previously collected parasitic charges from the acquisition regions into a first line in the memory structure, which is used as code information-free trash line, followed by
  an acquisition of photons for establishing the position code and
  a shift of the acquired charges from the acquisition regions into a second line in the memory structure, which is used as measurement line with code information.

In particular, the charges in the trash line can be transferred into a discharge structure for discharge and those in the measurement lines can be transferred into the readout structure for output.

The invention also relates to a computer program product with program code stored on a machine-readable medium, embodied as hardwired programmable logic controller or transmitted as a computer data signal embodied by an electromagnetic wave. Here, the program code performs the method according to the invention, in particular wherein the program code performs an actuation of a charge transfer in a position encoder according to the invention. This applies, specifically, when the program code is executed in an evaluation unit of a position encoder according to the invention and/or in an evaluation circuit connected therewith.

BRIEF DESCRIPTION OF THE DRAWINGS

The method according to the invention and the device according to the invention are described in more detail below, in a purely exemplary manner, on the basis of specific exemplary embodiments schematically depicted in the drawings, with further advantages of the invention also being discussed. Here, the shown figures should not be considered to be to scale. In detail:

FIG. 9 shows a first exemplary embodiment of a position encoder according to the invention;

FIG. 10 shows a second exemplary embodiment of a position encoder according to the invention;

FIG. 11 shows a third exemplary embodiment of a position encoder according to the invention;

DETAILED DESCRIPTION

Figure 1:
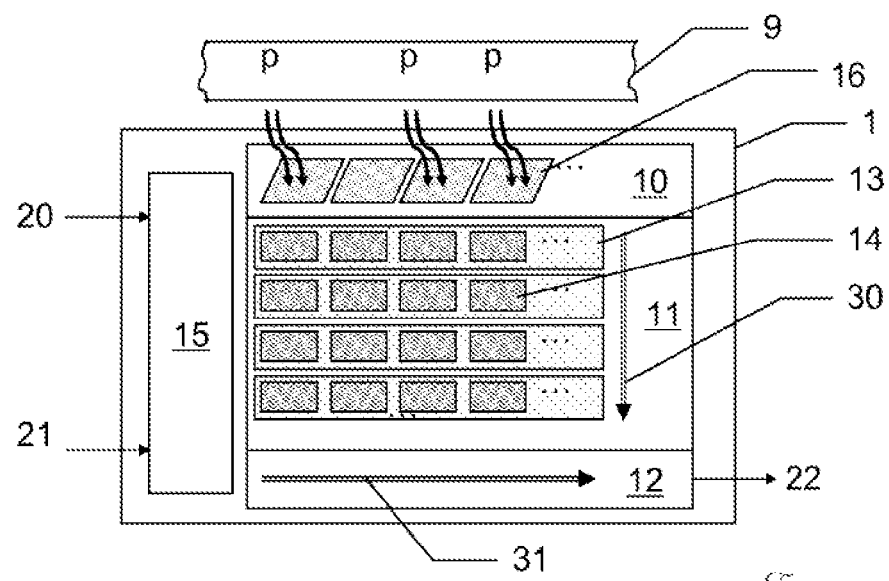
FIG. 1 shows a first embodiment according to the invention of a position encoder comprising an optical sensor element with a plurality of lines of analog memory cells.

FIG. 1 shows a position encoder 1 according to the invention—explained here on the basis of a line sensor—which optically acquires at least part of a position code 9. The position code 9 thus is acquirable by an optical sensor element in a form, for example by imaging thereof, shadow casting, projection, interference pattern formation, etc., wherein the code can, for example, be formed in the form of contrast areas, optically transmissive and optically opaque regions, surface textures etc. The sensor element contained therein comprises a photoactive acquisition region 10, which has assigned to it a memory structure 11 with a plurality of lines 13 of analog memory cells 14 per photoactive pixel 16. Therefore, a plurality of lines 13 of non-photoactive analog memories 14 are available for a photo-receiver line 10, which memories are able to store the free electric charges generated in the photo receivers 16 by the incident photons p. By way of example, from a technical point of view, such a structure can be manufactured as a semiconductor component using CCD technology or in a CMOS with a CCD structure. If the structure dimensions of the memories 14 are smaller in comparison to the photosensitive regions 16, this enables compact housing on the semiconductor substrate.

In one embodiment, the contents of the analog memory structure 11 are displaceable in a vertically downward direction (symbolized by the arrow 30) in the figure in this case. A very simple embodiment of a readout structure 12 can, for example, be implemented as a CCD line with a structure for serial-type shifting of the charges within the line to an output circuit. Here, the readout structure 12 can be embodied in the form of a readout line which, as the lowest line in the CCD structure, comprises a horizontal shifting functionality 31, by means of which a serial-type readout of the stored pixel charges is performable in order, by means of the output circuit, to obtain the electric data signal 22 at the output, which data signal depends on the respective number of pixel charge carriers. The readout can also be performed completely, or at least partly, in parallel.

The switching structure 15 serves for actuating the shifts of the charges, which are coordinated by an external trigger signal 20 and by a readout signal 21.

Figure 2:
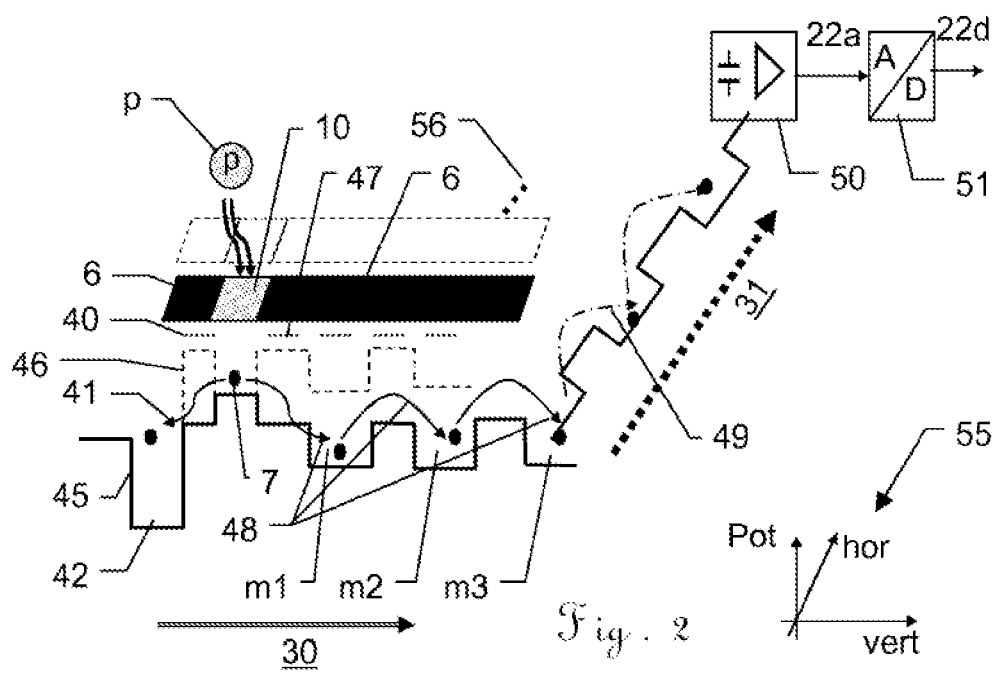
FIG. 2 shows a second illustration of an embodiment according to the invention of a position encoder comprising an optical sensor element with a plurality of lines of analog memory cells.

FIG. 2 shows a slightly more detailed, but still schematic illustration of an embodiment. When a photon p impacts, a photosensitive pixel 16 generates an electron-hole pair, wherein the free electron 7 is caught therebelow in a potential well. As a result of the electrodes 47 (depicted by the dotted lines), the form of the potential well can be varied between the full line 45 and the dashed line 46 (in the direction of the pot-axis of the coordinate system 55) and therefore the charges 7 can be displaced vertically (vert-axis of the coordinate system 55) by an appropriate actuation of the gates 47, as indicated by the arrows 48. These potential wells are, in this case, protected against light radiation (for example by the mask 6) in order to prevent further photoelectrons from being generated. The photoelectrons can be stored in the potential wells, which is why these are also referred to as analog memory cells m1, m2, m3. (In the other figures, the reference sign 14 is also used for the memory cells in general, independently of the order thereof). As indicated by the dots 56, the arrangement depicted here is arranged multiple times next to one another in the position encoder in order to obtain a line of photosensitive acquisition regions 16 with respectively assigned memory cells m1, m2, m3 (also in line arrangements).

Here, the lower-most line is embodied as a readout structure 12, which, in the shown case, is a horizontal shift register (hor-axis of the coordinate system 55), with the aid of which the pixel charges 7 can be displaced pixel-by-pixel (arrow 49) toward a charge-voltage conversion 50 for conversion into an analog electric data signal 22a, which may be converted into a digital electric data signal 22d sensor internally or sensor externally using an analog-to-digital converter 51.

The acquisition by the trigger signal can be triggered either with a constant rate or due to an external trigger signal—of any kind—occurring at an arbitrary, nondeterministic time, or else by a combination of both. Especially in the case of acyclical triggering, as occurs, for example, in the case of trigger signals generated by external sources, such as from a probe head of a coordinate measuring machine, a sensor, end switch or any other source for trigger signals, it may furthermore be necessary to provide special precautions for erasing the CCD structure.

In the case of image sensors from the prior art, the whole CCD chip is erased in each case using a reset signal. However, within the meaning of the present invention, erasing the whole analog memory is not expedient in all cases since the analog memory may still contain previously acquired lines of measurement values which are yet to be evaluated. In order nevertheless to be able to ensure defined states of the memories within the scope of the present invention, a reset needs to be performed differently in such cases. If the analog memory structure does not contain any measurement values, for example in the case of a constant rate measurement, in which the times between two trigger signals are longer than the time required for the readout, it is possible in each case to erase the whole analog memory structure (which simplifies the actuation of the erasing and as a result of which a higher reliability can be obtained).

By way of example, charges collected in an unwanted manner which are not to be evaluated can be shifted downward only and can be discharged directly there as an alternative to a readout (i.e. not fed to a serial evaluation but, in particular, discharged in parallel). By way of example, this discharge can be effected right at the bottom in the last memory line (or following the latter), which last memory line can alternatively be read out or erased.

Alternatively, a discharge of charges not to be evaluated, for example such charges which are collected between two trigger signals in the photo element 16, can also be discharged directly at said photo element, for example in an "upward" direction. This is depicted on the far left in FIG. 2 by virtue of a further gate 40 actuating a potential barrier to a discharge 42 (gutter, scavenger diode). The latter discharges electrons 7 which are possibly present prior to the trigger signal in the direction 41 such that a defined state prevails in the photocell 16 and in the potential well m1 prior to the acquisition of the photo-charges 7.

Within the scope of the present invention, it is also possible to apply CDS (correlated double sampling) structures in order to reduce the noise introduced during the readout by virtue of the measurement value being related to a reference value in each case, as is explained in e.g. U.S. Pat. No. 4,287,441 or in other documents. Moreover, when applying a CDS evaluation, it is, for example, also possible to dispense with exactly resetting the readout structure prior to each readout. By way of example, in the case of a differential value determination, a reset only becomes necessary if the readout circuit would otherwise (potentially) become saturated. Moreover, in the case of the differential evaluation the CDS principle notwithstanding, there can only be one readout and digitization per pixel (for a majority of the pixels 16), which significantly reduces the readout time in relation to conventional CDS with in each case sampling the reference value prior to, and after, the transfer of the pixel charge.

If correlated double sampling (CDS) is realized, this can be implemented in the lowermost line. Here, the charge which is currently being output can also be stored in capacitors of the CDS circuit rather than in a memory of the CCD structure. Here, signals of the actuation unit can predetermine the time at which the measurement signals are shifted into the CDS, either by external signals or in a predetermined sequence. By way of example, in one embodiment, the shift into the CDS can always be performed directly prior to the output. In this case, measurement signals are not shifted into the lowermost line—which is now reserved for the CDS—after the measurement (as is depicted in the figures for the reasons of simplicity), but rather into a line thereabove. Only upon the readout signal is the CDS executed, the measurement 0 (m0) shifted into the readout line and subsequently output. The contents of the occupied memory lines lying thereabove can, in the process or thereafter, be advanced accordingly.

Moreover, thermally generated charge carriers, the so-called "dark current", can be compensated for or reduced by means of known processes such as averaging, reading out of one or more dark pixels, cooling of the sensor, etc. A noise reduction as a result of a slow readout, a so-called "slow scan", can, according to the invention, likewise be applied. Since, according to the invention, the readout no longer leads to the encoder being blocked for further trigger signals, it is also possible to apply a relatively slow readout. Therefore, the readout speed no longer is restrictive on the trigger rate, provided enough free memory lines are still available, in particular, therefore, provided that the short-term trigger rate multiplied by the readout time remains smaller than the number of memory lines.

Figure 3:
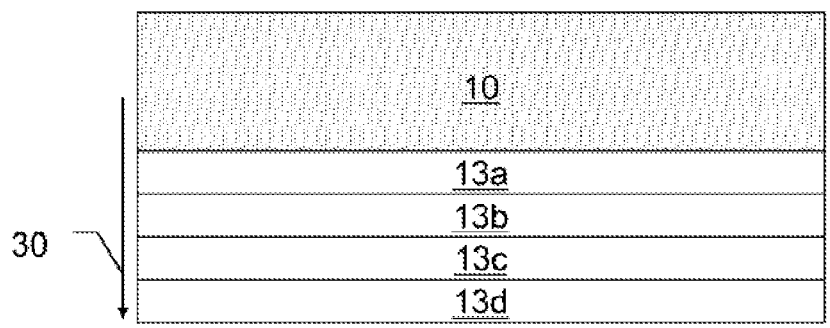
FIG. 3 shows a third embodiment according to the invention of a position encoder comprising a sensor element with four exemplary analog memory lines for a single photosensitive line.

FIG. 3 shows the active optical surface in the form of a sensor line 10 and, therebelow, a structure for analog storage 13a, 13b, 13c, 13d of up to four measurements. The photo-charges generated in the sensor line can be shifted in the direction 30 into the memory structure and can, in the latter, also be shifted line-by-line in each case. As symbolized in the figure, the regions for analog storage 13a, 13b, 13c, 13d may take up a different region on the semiconductor substrate than the optically active surface. In particular, in terms of the geometric dimensions thereof, the memory cells may be smaller than the photosensitive regions assigned thereto.

In order to describe a position encoder according to the invention, it is also possible to describe the embodiments thereof by virtue of directions being specified. Here, the labels horizontally and vertically, or up, down, left and right, in each case relate to the respectively depicted figures and should not be considered to be absolute. The geometric arrangements of the structures in a specific semiconductor structure may also, by all means, deviate from these "logical" directions mentioned here, provided reference is not made explicitly here to the semiconductor structure arrangement.

This relates to a position encoder 1 comprising a sensor element for optical position code acquisition, comprising a horizontal photo-line 10 and a vertical structure of a plurality of horizontal analog memory lines 13a, 13b, 13c, 13d (four of which are shown in an exemplary manner), which are actuatable by a switching structure for selective vertical shifting 30 of the charges between the individual analog memory lines 13a, 13b, 13c, 13d.

The lowermost line is embodied as a readout structure for parallel or serial output of the charges (e.g. with conversion into an electric data signal for further processing and position determination).

Triggered by a trigger signal, the photo-generated charges are shifted vertically from the photo-line 10 (in particular in succession/in series) into that unoccupied analog memory line 13a, 13b, 13c, 13d, which lies closest to the readout line 10, while the already occupied lines are not shifted. After completion of a readout process, (possibly present) occupied analog memory lines 13a, 13b, 13c, 13d are shifted vertically one line downward into the readout line and are read out there (vertically or horizontally) on the basis of a readout signal. The occupied lines situated further above accordingly advance after the readout of one line.

Consequently, in order to obtain such a shiftability, the lines of the memory structure are selectively shiftable individually or in groups, wherein, especially a split shiftability of the lines within the memory structure is present, in which a selectively selectable, upper line region of the memory structure is shiftable for an advance from the photoactive line on the basis of the trigger signal and, separately therefrom, a lower line region of the memory structure is shiftable in the direction of the readout line on the basis of the readout signal. Here, the position of the boundary between the upper and lower line region is variable, depending on the fill state of the memory. Since, according to the invention, trigger and readout signals may occur asynchronously in relation to one another, it is consequently also possible for parts of the memory structure to be shifted asynchronously in relation to one another.

In another embodiment of a sensor element for a position encoder 1 according to the invention, this can be produced by virtue of a standard two-dimensional surface CCD structure being modified in such a way that a single line 10 is now photoactive and all further lines are darkened, i.e. masked by a light-opaque layer. Since these masked—and therefore no longer light-sensitive—lines can now be used merely as a line-by-line shiftable charge memory, an embodiment which realizes a line sensor emerges in the case of an appropriate actuation of a switching structure according to the invention, which enables selective shifting of individual lines or portions of all lines and not merely of the whole memory structure. Here, the line clock for shifting the charges from the photoactive line 10 is caused by the trigger signal. By way of example, there could be a shift of the photo-charge from the line 10 to one of the darkened lines 13a, 13b, 13c, –13d with the rising and/or falling flank of the trigger signal in each case, i.e. a shift of the charges in the direction of the readout line to the last, still unoccupied memory line 13a, 13b, 13c, 13d in front thereof, with, however, the occupied memory lines not being co-shifted.

Figure 4:
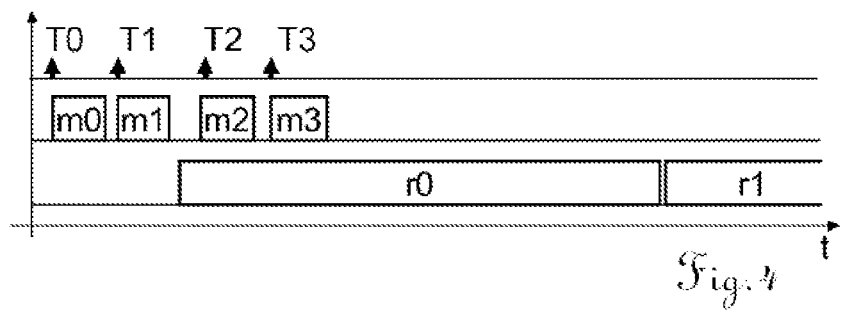
FIG. 4 shows a first timing diagram for signal processing in an embodiment according to the invention of a position encoder.

FIG. 4 shows exemplary trigger timing and the time durations of the measurement (i.e. of the optical acquisition) and of the readout of the lines, depicted over a horizontal time axis t. Each trigger signal T0, T1, T2, –T3 in the upper line triggers a measurement (m0, m1, m2, m3) in the middle line—that is to say, the charges of the photosensitive element 10 are shifted into analog memories 13a, 13b, 13c, 13d. At a subsequent time, these measurements can be clocked out in analog form from the occupied analog memories 13a, 13b, 13c, 13d and digitized using e.g. an A/D converter, which is depicted in the lower line by the associated time durations r0 and r1. There can be a signal (e.g. via an electrical connection of the sensor element) for the triggering at the top and for the readout at the bottom. By way of example, the acquisition or measurement can be effected with a predetermined, in particular constant exposure duration m0, m1, m2, m3. After a first line with memory values m0 has been output at the end of r0, it is subsequently possible, also directly thereafter, to output the next line with memory values m1 during the time r1 by virtue of this line being shifted downward into the readout structure.

Alternatively, it is also possible to evaluate a whole line or parts thereof, in each case in parallel using a plurality of A/D converters. Since, as a result of the analog storage according to the invention, the readout speed is no longer the critical factor in respect of the admissible time intervals between two directly successive trigger signals (e.g. T0 and T1), especially in the case of a sufficient memory depth of the memory structure 11, such a parallelization and the hardware complexity thereof are no longer mandatory during the readout for satisfying the requirements in the case of temporary bursts of a few trigger signals T0, T1, T2, T3 following one another in quick succession. However, the readout speed should clearly be dimensioned in such a way that the latter enables a readout of all values, at least in the case of an average, mean trigger rate—for the purposes of which, an (at least partial) parallelization of the readout may also be applied where necessary. The required memory depth of the analog memory structure 11—i.e. how many lines 13 need to be stored in analog form in order to meet the requirements of the application—is also determined within the scope of such considerations in respect of the trigger and readout rates for the specific application case. By way of example, in this case, use can be made of a worst-case scenario, or it is also possible to apply statistical methods.

Figure 5:
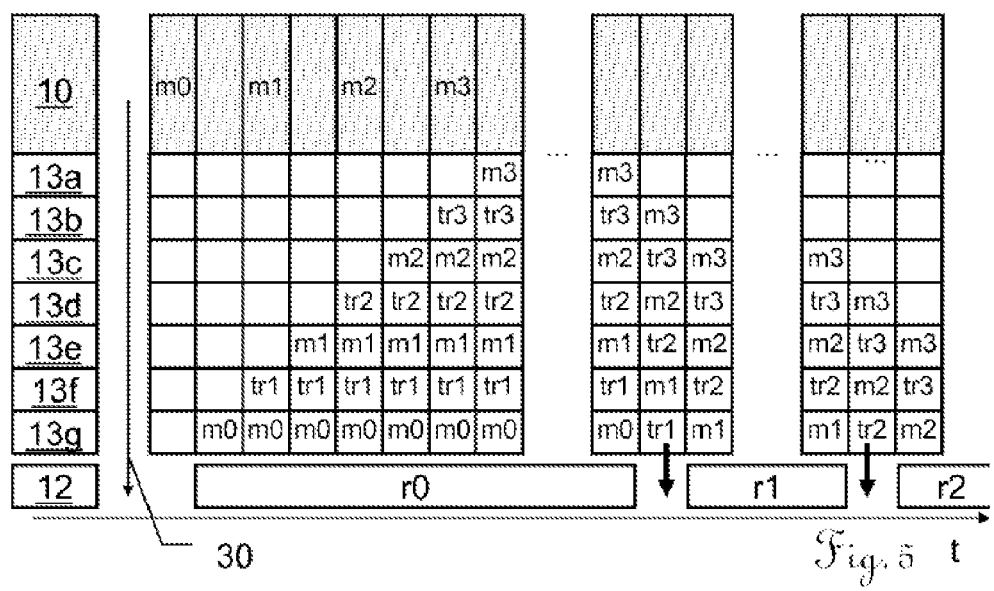
FIG. 5 shows an illustration of an exemplary trigger and readout process in a position encoder according to the invention.

FIG. 5 shows an embodiment in which the generation of a defined state prior to the code acquisition is solved in a specific manner.

In order always to have the same pre-conditions in the position encoder 1 for accurate measurements, it is advantageous to bring the active sensor surface 10 and the involved analog memory regions in the memory structure 11 into a defined state, i.e. to reset these—which is subsequently also referred to as erasing—for each trigger signal T0, T1, T2, T3. In the prior art, such erasing in the case of CCDs is always applied to the whole structure 11; however, this is not always possible in the present case, as described above, since a possibly available previous measurement is still to be stored.

In order to achieve this, provision can be made for e.g. trash lines tr in the memory structure 11, which buffer store charge which may have been collected in the time between the preceding measurement and the current measurement. This unwanted charge, which is created between two measurements (by exposure, dark currents, etc.), is collected in these trash lines tr, but not evaluated. Here, these trash lines tr can have the same embodiment as the memory lines; thus, specifically, merely the available memories in the structure 11 are used either as trash lines tr or as memory lines m.

The trash lines tr can be co-shifted downward with the lines to be evaluated in the memory structure and the charges thereof can be fed directly to a discharge (e.g. to ground) instead of being evaluated. This discharge can be effected in series by clocking out or else in parallel for the whole line. Therefore, only the lines containing measurement data are output as data signal and fed to an evaluation.

FIG. 5 shows an example of such an embodiment which, compared to FIG. 3, has a memory structure 11 which is expanded by three lines. Here, the readout structure 12 is also depicted explicitly. The time progression (with the same timing as in the preceding figure) is depicted therebelow. Here, it is also possible to identify the individual shift of memory lines, to be carried out in the process, for advancing the just acquired charge to a lower, already occupied part of the memory structure which is not co-shifted in the process.

Although measurement m0 is already output as r0 during the measurements m2 and m3, the analog line memory is still occupied until the line has been output in its entirety. Alternatively, the line can also already be free after the CDS, by way of example by virtue of the charges being buffer stored in capacitors for the serial output. The memory values are only shifted downward following the output of r0 and the first trash line tr1 can be erased. If—as described above as an alternative—the line is already free, the shift of internal memory lines can already be caused by an external signal during the output of r0, for example by means of a further trigger signal as well, by means of which a new measurement m1 is triggered. Subsequently, the measurement signal from the measurement m1 is ready for output and can, in particular, be output directly thereafter. Subsequently, there once again is a shift downward by one and the trash line tr2 can be erased and, subsequently, the measurement m2 can be output during the readout r2.

Alternatively, a discharge of undesired trash lines can also be effected higher up in the memory, as a result of which fewer trash memory lines are required. Thus, for example, a specifically provided trash memory line may be arranged "above" the photosensitive element and, accordingly, measurement values may be shifted downward into the analog memory array and trash values may be shifted upward.

In another embodiment, the discharge of unwanted charges between two measurement value acquisitions at the trigger times can also be effected directly on the photosensitive element, for example by virtue of the output thereof being connected to ground or a reference level in the rest state, i.e. without a trigger signal, and the charge carriers only be accumulated and subsequently being shifted downward into the array in the case of triggering. Such a principle was also already explained in FIG. 2 (e.g. as a scavenger diode).

Figure 6:
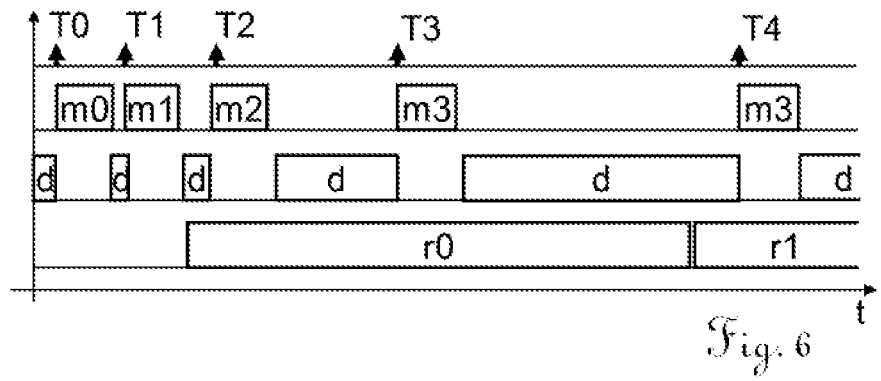
FIG. 6 shows a second timing diagram of the signal processing in an embodiment according to the invention of a position encoder.

In this respect, a timing diagram is once again shown in FIG. 6, wherein, in the second line from the bottom, the actuation of the erasing gate d for discharging unwanted charges between the measurements has been added. The advance of the memory lines is in this case effected in each case between two readout processes r0 and r1.

However, it should be noted here that, in addition to the photosensitive region, the lines provided for analog storage should also be erased before these are written to since charges from leakage currents, etc., which could falsify the measurement values, may also accumulate therein. Therefore, erasing from the bottom to the top should always be started in that memory line in which no measurement signal is stored any more, i.e. comprise all empty memory lines from bottom to top. The current measurement value is subsequently shifted downward through these empty lines to the lowermost free line.

Alternatively or additionally, there may also be a compensation of parasitic charges by the mentioned co-shifting of the dark pixels and the taking account thereof during the evaluation.

Figure 7:
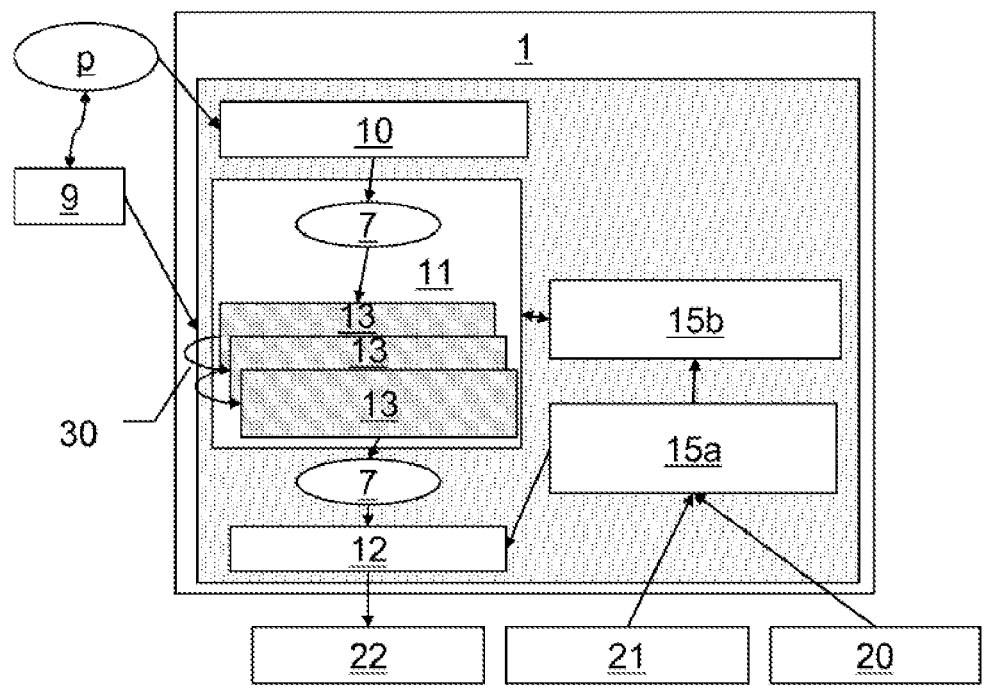
FIG. 7 shows a block diagram of an embodiment of a position encoder according to the invention.

FIG. 7 shows a schematic block diagram of an embodiment of a position encoder 1 according to the invention, comprising an optical sensor element. Herein, depending on the position code 9, photons p impinge on the acquisition regions 10 and are converted into charges 7 therein. These charges 7 are shifted into the analog memory structure 11 in a manner controlled by an actuation logic 15a and a switching structure 15b and in a manner dependent on a trigger signal 20, and said charges are stored there in memory cells, in particular in CCD potential wells. Depending on a readout signal 21, the charges 7 are shifted into a readout structure 12 by the switching structure 15b, from where they are output as a code word dependent on the acquired position code 9 at the time of the associated triggering 20 under conversion into an electric data signal 22. Here, the actuation logic 15a coordinates the processes in such a way that the occupied memory structure 11 is advanced in the direction of the readout structure 12 during the readout 21 and, during triggering 20, the charges 7 in the memory structure 11 are shifted into the closest free memory line 13 as seen from the readout structure 12, without, in the process, shifting the occupied memory structure 11. Here, there can be erasing of the respective target line prior to each shift in order to discharge possibly present, parasitic charge collections.

Figure 8:
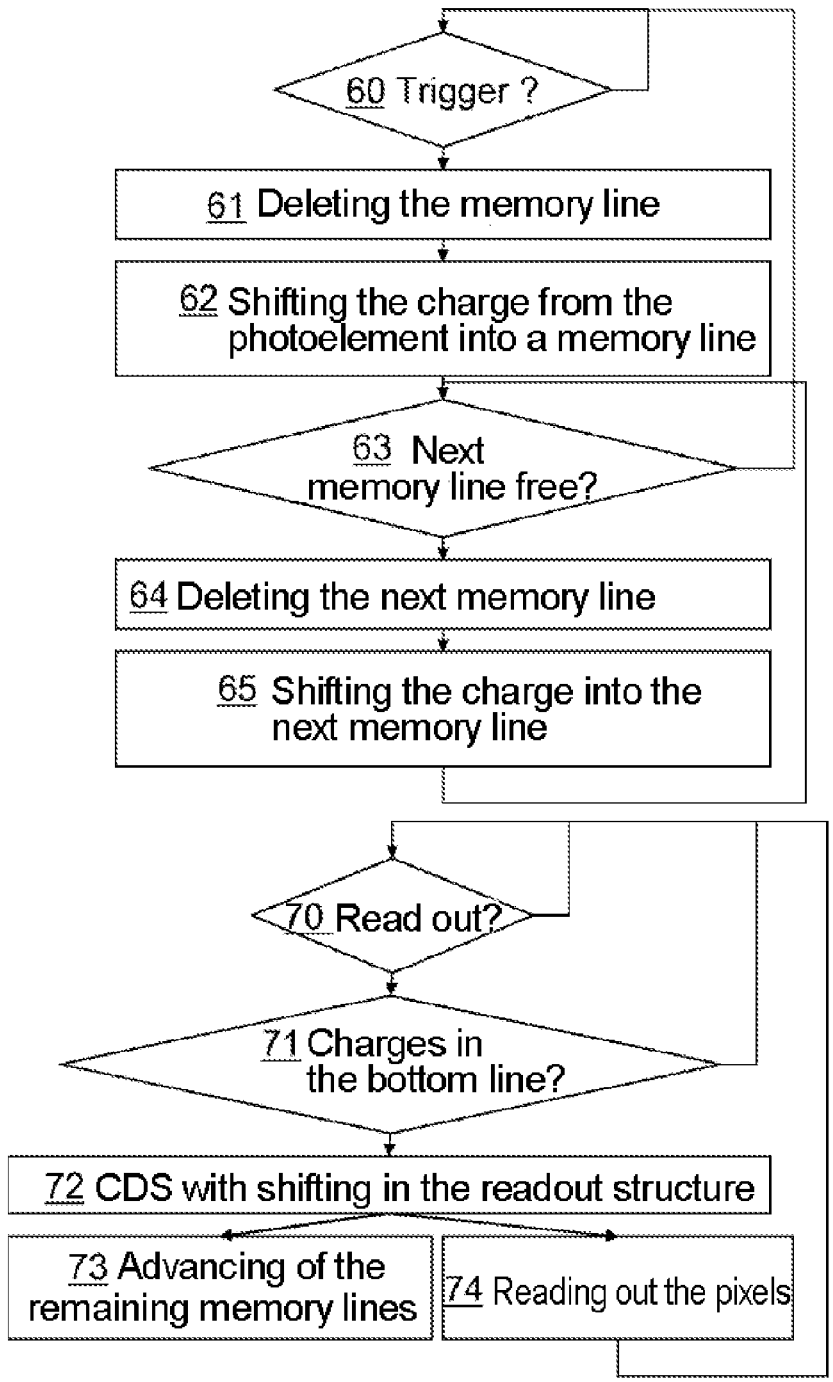
FIG. 8 shows a flowchart of an embodiment of a method for optically acquiring a position code.

FIG. 8 depicts an exemplary flowchart for an embodiment according to the invention of the method for optical acquisition of a position code. The method has two mutually asynchronous parts, i.e. parts which can be executed temporally independently of one another—apart from trivial causality conditions and a restriction by a finite number of memory lines.

The part depicted in the upper half is triggered by the trigger signal checked in the query 60. Following the trigger signal, a line of the memory structure is erased in step 61 and, thereafter, the charges of the photo-line are shifted therein and stored there in analog form. Optionally, there is a wait for a defined exposure time prior to the shift, during which exposure time the charges are collected—distributed over the photocells in a code-dependent manner. The charges can be shifted in the memory structure further in the direction of the readout structure, as shown in step 65, possibly after respective previous erasing of the target line depicted in step 64, provided that the target line is not already occupied by previously stored charges, which is checked by the query 63.

The part depicted in the lower half is triggered by a read signal checked in the query 70. Provided that, in accordance with the query 71, stored photo-charges are present in the memory structure, these are shifted into the readout structure in step 72 which, when necessary, was also erased previously. This shift can be effected under application of the CDS principle or a CDS may be carried out prior to the shifting. The remaining lines in the memory structure, in which, likewise, photo-charges from other trigger times are stored, are advanced accordingly in step 73 in the direction of the readout line. In the readout line, there is the readout and conversion into an electric data signal in step 74, which data signal represents the illumination conditions at the photo-line at the associated trigger time. Here, the readout of the output line can be effected in series or in parallel or in a mixed form of both and can, for example, also comprise an amplification and/or digitization of the values. The readout 74 can be effected before, after or parallel in time with the advance 73.

FIG. 9 shows an embodiment of a position encoder 1 according to the invention as a rotary position encoder with a ring-shape code carrier which carries the position code 9. In the left-hand part of the image, the code is impinged upon by optical radiation p using the reflected-light method, with a transmitted-light method being applied in the right-hand part. This constitutes two alternatives which are usually not used together in one position encoder. However, a position code acquisition is often performed at a plurality of points on the code carrier in order to improve the measurement accuracy or create redundancy by averaging, error modeling, etc. By way of example, by picking up a rotational code a number of times along the circumference thereof, it is also possible to establish and compensate for a dynamic eccentricity, as a result of which, for example, the quality requirements on the bearing of such a rotary encoder are reduced.

FIG. 10 shows a transmitted-light method for acquiring a position code 9 in a position encoder 1 according to the invention as described above. In addition to the imaged coding 9 with light-transmissive and light-opaque surface regions, it is also possible to use a different code, e.g. a diffractive pattern or natural texture, as a code.

FIG. 11 shows an exemplary embodiment of a position encoder 1 according to the invention as a linear position encoder. Part of the position code 9 is made acquirable through optical radiation p of the encoder 1 such that the line of photosensitive elements 10 can read this code region, in the example shown here using transmitted illumination of the position code section 9. Embodiments of the shown position encoder 1 according to the invention were already discussed above in detail.

Figures 12, 13:
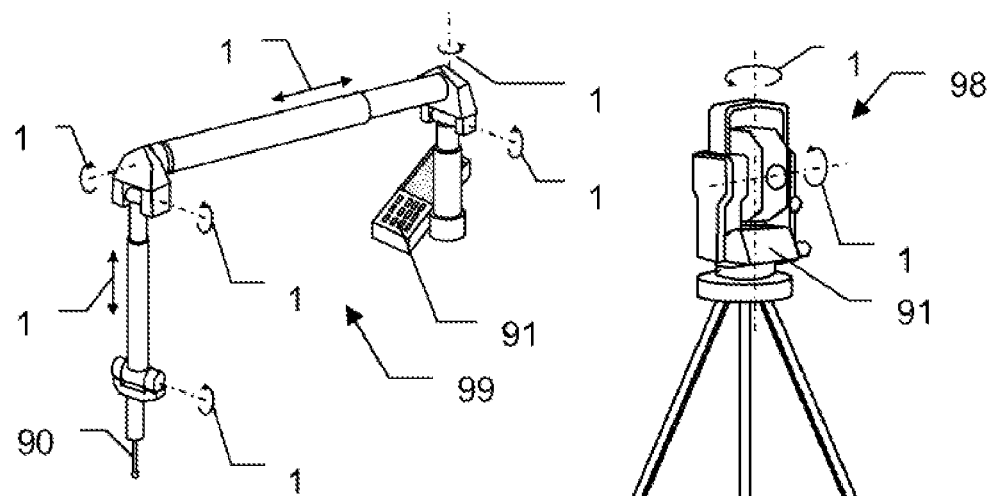
FIG. 12 shows a first application example of position encoders according to the invention in a coordinate measuring machine.
FIG. 13 shows a second application example of position encoders according to the invention in a geodetic measuring instrument.

FIG. 12 shows an example of a coordinate measuring machine 99 as an articulated arm, which is equipped with a touch-trigger probe 90. Linear and rotary position encoders 1 according to the invention are installed in the shown arm for a highly-precise position value acquisition triggered by a trigger signal from the touch probe 1. In particular, in the case of fast movements, in the case of trembling of the operator or in the case of vibrations of the machine, the trigger signals, which trigger the measurements, occur with very short time intervals, especially as bursts of trigger pulses. A position encoder 1 according to the invention is able to acquire a code value for each one of the individual pulses in the case of such bursts of trigger signals.

By way of example, fast mean value formations can also be performed using the sensor. Thus, for example, in a different embodiment in the case of an articulated arm with a "touch-trigger probe", a number of N measurements can be made at one point in quick succession when the measurement thereof is triggered, which measurements can subsequently, in turn, be processed more slowly by a control unit 91 while the user targets the next measurement point. A consequently possible mean value formation from the N measurement values may be helpful for increasing the accuracy of the measurement or for excluding erroneous measurements.

FIG. 13 shows a geodetic surveying instrument 98 with position encoders 1 according to the invention for determining a rotational position of a target axis of the instrument about a vertical axis and a tilt axis at the time when the measurement is triggered. As a result of the high temporal synchronicity obtainable according to the invention, it is possible to preclude movements between the acquisition of the positions in the horizontal and in the vertical direction, and consequently it is possible to ensure a high consistency in the measured spatial coordinates, even if a servomotor for the axis movement is still oscillating or has overshot its position.

Figures 14A, 14B, 14C, 14D, 14E:
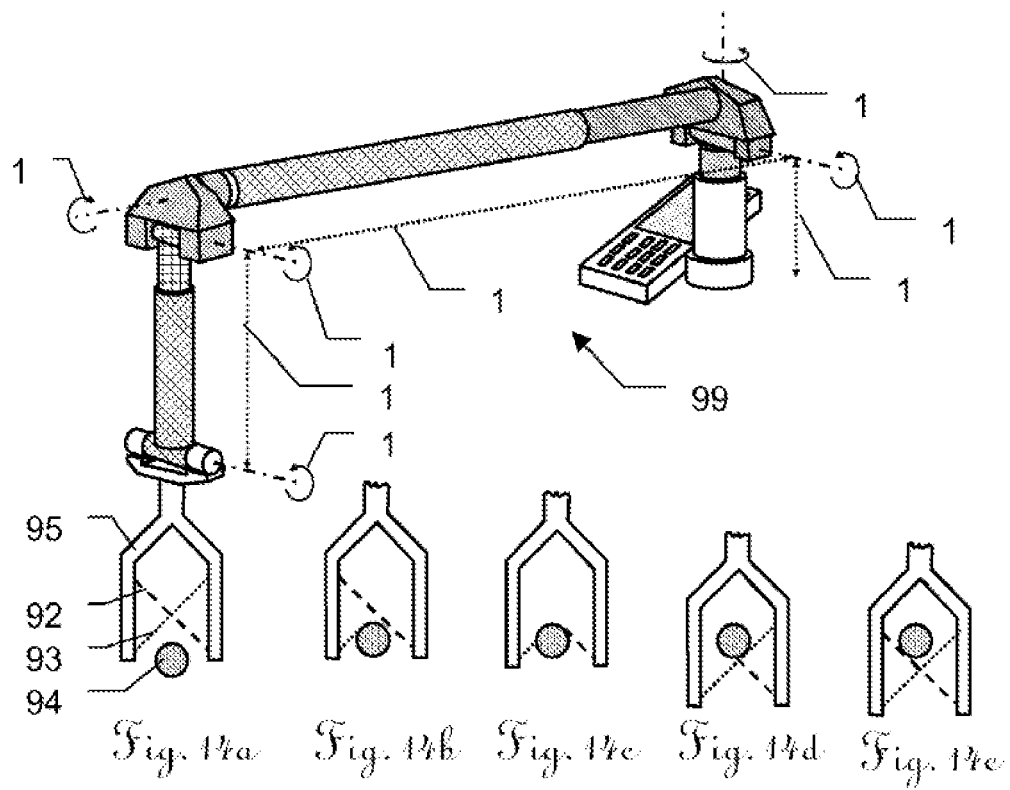
FIGS. 14a to 14e show a third application example of position encoders according to the invention in a coordinate measuring machine as an example for a measurement with a plurality of trigger signals following in quick succession.

FIG. 14a shows an exemplary application of position encoders 1 according to the invention in a coordinate measuring machine 99, specifically in an articulated arm with a measurement head 95 for establishing pipe diameters. Here, the position information from the rotary and/or linear encoders 1 of the arm are acquired in the case of each trigger signal. Here, the measurement is usually carried out by hand by virtue of the user guiding the fork-shaped measurement head 95 over the pipe 94 to be measured. However, alternatively, this movement can also be performed in an automated manner by a motorized coordinate measuring machine 99.

The actual measurement—as illustrated in FIG. 14a to FIG. 14e—proceeds in such a way that a trigger signal is triggered at any time when the light beam 92, 93 is interrupted or reestablished by the test object 94, which trigger signal triggers the determination of the angle and/or length measurement values.

No beam 92, 93 is interrupted in FIG. 14a. If the measurement fork 95 is now lowered over the pipe 94, the first light beam 93—depicted by the dotted line—is interrupted such that a first trigger signal is triggered; this is shown in FIG. 14b. During the further immersion of the pipe 94 into the fork 95, the second light beam 92—depicted by the dashed line—is also interrupted, as shown in FIG. 14c, and so a second trigger signal is triggered. Triggering of the third trigger signal is shown in FIG. 14d and caused by the unblocking of the first light beam 93 in the light curtain. In FIG. 14e, the second light beam 92 is also unblocked again during the further movement of the fork 95 over the pipe 94, triggering the fourth trigger signal.

The pipe diameter can now be established on the basis of the measurement value acquisitions, triggered in each case at the four trigger times, in the position encoders 1 according to the invention of the coordinate measuring machine 99. In the shown application of a pipe measurement, the trigger signals of the right-hand 93 and left-hand 92 sensor follow in very quick succession in the case of a central movement of the fork 95 over the pipe 94, for example. As a result, correspondingly short measurement times are required in the prior art, which require fast, and usually also expensive electronics. Moreover, fast electronics also generate high thermal losses which adversely affect the obtainable accuracy due to e.g. the temperature changes occurring in the process and the temperature expansions connected therewith.

According to the invention, the acquired position code is now temporarily stored in analog form in the light-sensitive sensor of the position encoder 1 itself (i.e., for example, in the CCD or CMOS array), which is possible within a short period of time and with low energy outlay. The information stored in analog form can subsequently be read out—even with a slower speed. Thus, the readout can by all means require a longer period of time than the time between two trigger signals. By way of example, the readout and processing, which is linked to e.g. a clocking out of the analog values, an analog-to-digital conversion and a position calculation, may also take longer than the time between two triggers of the trigger signal.

Here, the values from the acquisition regions, stored in analog form, may, in addition to being clocked out in series, also be digitized in parallel and may optionally also be buffer stored on the sensor again in digital form. Moreover, a direct evaluation of the acquired position code (or preprocessing in this respect) may be effected on the sensor.

Figure 15:
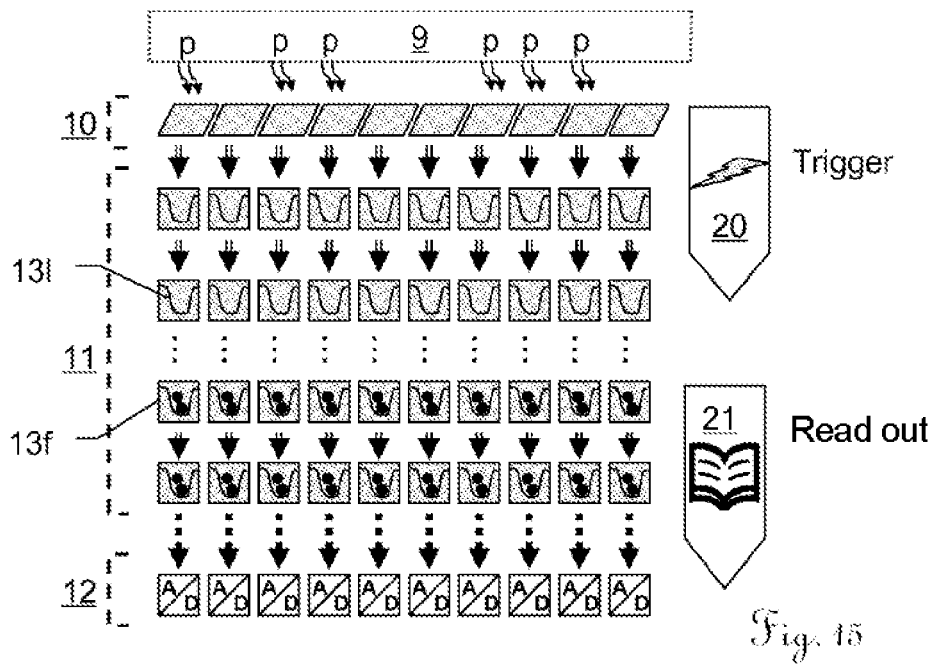
FIG. 15 shows a schematic illustration of a fourth embodiment of a position encoder according to the invention.

FIG. 15 shows an embodiment with a photosensitive line 10, for example embodied as a line of backside-illuminated photodiodes, which is followed by an analog CCD memory structure 11, in which charges can be shifted in a shift direction in the direction of the readout structure 12. The shift is triggered by a trigger signal 20 and the charges are shifted to the lowermost one of the unoccupied memory lines 131. The occupied memory lines 13f are shifted in the direction of the readout structure 12 on the basis of a readout signal 21. In the embodiment depicted here, this is embodied as a parallel evaluation of the whole line, for example using CMOS technology with a CCD structure.

Figure 16:
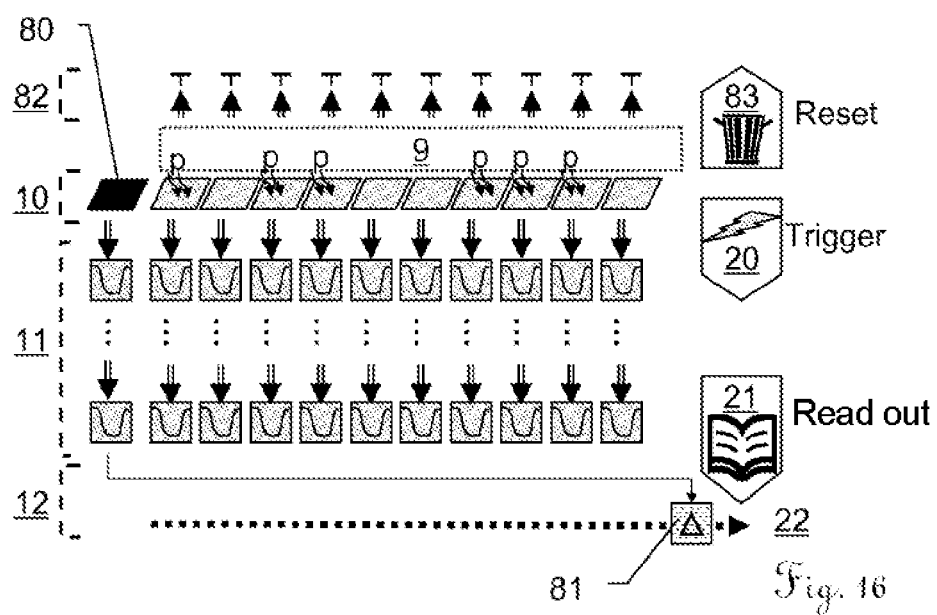
FIG. 16 shows a schematic illustration of a fifth embodiment of a position encoder according to the invention.

In the embodiment of FIG. 16, a dark pixel 80 is depicted next to the photosensitive line 10, in which dark pixel no photo-charges but merely parasitic charges are collected, which can then be subtracted from the pixel measurement values as dark references, particularly during readout. In practical applications, it is also possible to apply a plurality of such dark pixels 80, for example in order to obtain an average of the dark value. The dark value subtraction can be performed in analog form, e.g. during the shift into the readout structure 12, or in digital form, i.e. after the readout has taken place. In the illustration, a CDS circuit 81 is shown in the readout structure 12, which CDS circuit uses the dark value of the dark pixel 80. In this embodiment, an erasing structure 82 is depicted over the photo-line 10, by means of which erasing structure the charges are discharged from the photocells in the absence of a trigger signal 20. The photo-charges are only collected at the trigger time and subsequently shifted into the memory structure 11, as described previously. The readout is effected by a readout signal 21 which can be triggered independently of the trigger signal 20. Triggering 20 and triggering 21 can thus be effected asynchronously in relation to one another (apart from trivial conditions such as, for example, that readout prior to triggering is not possible, that at least one of the memory lines must be free during triggering in order to obtain no data loss, etc.).

Figure 17:
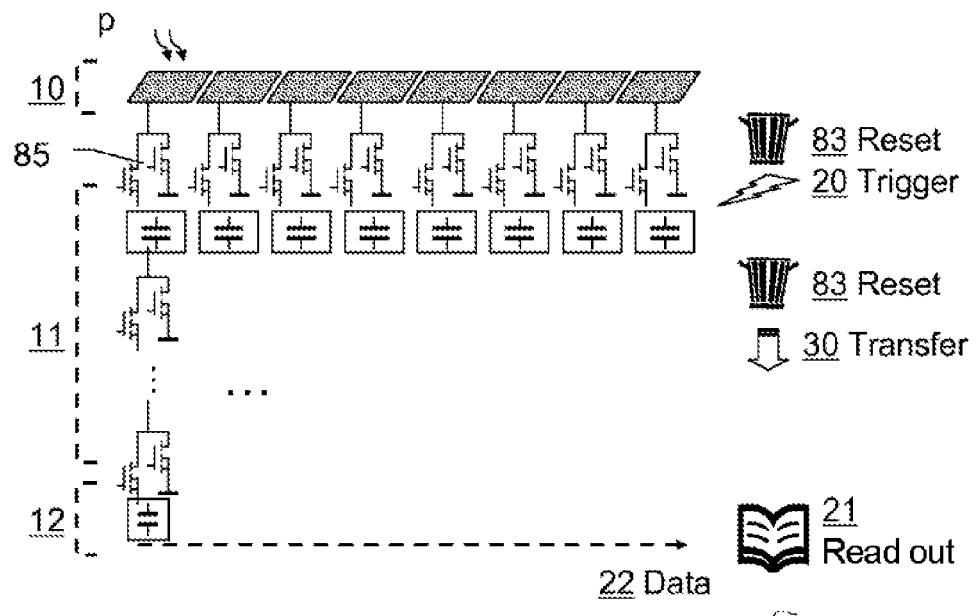
FIG. 17 shows a schematic illustration of a sixth embodiment of a position encoder according to the invention.

FIG. 17 illustrates an embodiment in which the analog memory structure 11 is embodied as a capacitor structure using CMOS technology rather than as a CCD structure. Here, like in the case of the analog CCD memories, a symbolically indicated switching structure 85 is provided at each one of the memory lines for the line-by-line shifting 30 or erasing 83 of charges. The bottom line is implemented as readout structure 12, which is actuatable by a readout signal 21 which is temporally independent of the triggering.

In other embodiments, rather than being embodied as a shift register using CCD technology, the readout structure 12 following the analog CCD memories (i.e. downstream thereof in the shift direction 30) can also be embodied as a line of capacitors, in which the charges are shifted for evaluation purposes. These capacitors can be evaluated either in parallel (by in each case one ADC per capacitor) or in sequence (by a multiplexer circuit on one or more ADCs). Therefore, the bottom CCD line is free for subsequent measurement during the readout process.

In such a different embodiment, the previously described correlated double sampling 81 can also be applied by shifting the charges from the analog memories 11 of the CCD structure into the capacitors of the readout structure 12. Depending on the implementation, the CDS 81 can in this case be performed in parallel for the whole line or in series. In addition to an analog CDS 81, it is also possible to carry out a digital variant of the CDS by virtue of at least one reference value of the CDS likewise being digitized and then being taken into account numerically, i.e., for example, being subtracted, during the evaluation of the digital pixel values.

Figure 18:
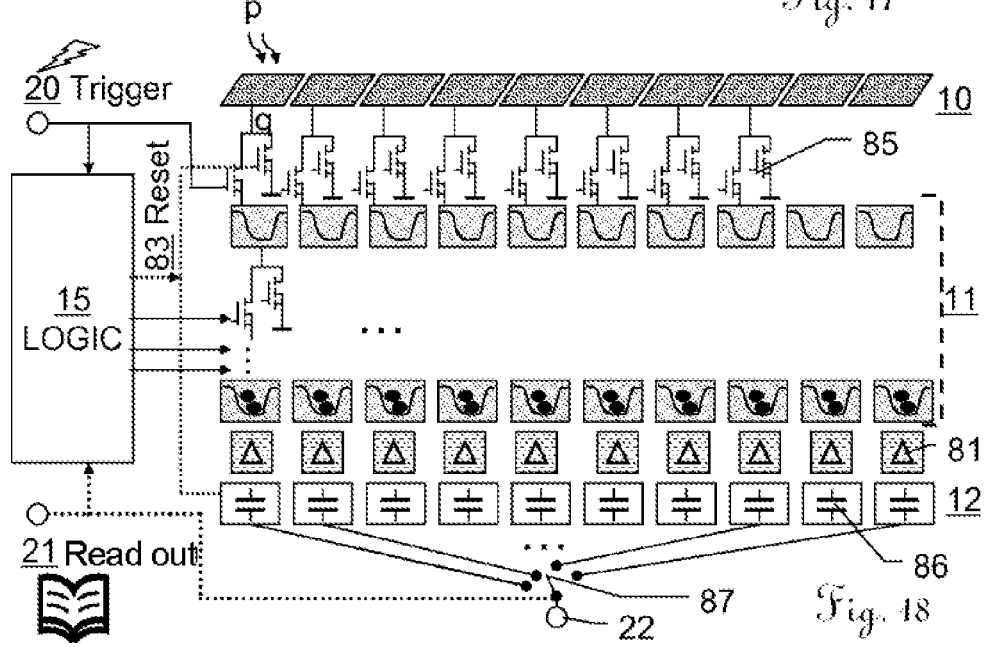
FIG. 18 shows a schematic illustration of a seventh embodiment of a position encoder according to the invention.

In the embodiment shown in FIG. 18, the readout structure 12 can, for example, be embodied as a line of capacitors 86 which are provided with a multiplexer structure 87 as a data signal 22 at an output for amplification and/or A/D conversion. This readout is effected via one or more read-out signals 21, which control the readout process. At the beginning of each readout process, the charges from the bottom line of the analog CCD memory structure 11 are applied to the capacitors via a CDS structure 81. Here, the CDS 81 can be performed in parallel for the whole line. The capacitors 86 can still be actively erased, i.e. freed from possible parasitic charges, for example by discharging the charges to a lower potential, prior to the transmission of the charges from the CCD.

Here, the analog CCD memory structure 11 is embodied in such a way that a line-by-line shift of the photo-charges p in the downward direction is performable thereby, wherein, in particular, not only the whole memory structure 11 is shiftable, but a shift only takes place as far as the lowest free memory line and lines situated further below, which are already occupied by previously acquired photo-charges, are not co-shifted. Moreover, each one of the lines is individually erasable. In addition to the individual erasing, provision can also be made for an appropriate actuation for erasing the whole CCD structure 11. This functionality is symbolized by the depicted switching structure 85 from one line to the next or to the ground. Here, the depicted switching structure 85 has a symbolic character and does not necessarily depict a practical implementation of the actual semiconductor structure for these functionalities which, taken for themselves, are of course known from the prior art.

Actuating the shifting and erasing is effected by means of an actuation logic 15. The primary object of the latter is to shift, in the case of a trigger signal 20, the charges in the photo-line 10 into the CCD structure 11 in a line-by-line manner and, there, into the lowest free line. Here, the target line or target lines can be erased prior to each shift. When a read process is triggered by the read signal 21, the charges (possibly by applying CDS) are shifted into the readout structure 12 and output from there, for example to a full-pipelined ADC. In the process, all memory cells in which photo-charges are situated are accordingly advanced in the downward direction, wherein the target lines may likewise be erased in advance in correspondence with the advance. This requires a selective, line-by-line shifting and/or erasing functionality of the CCD memory structure 11, which, for example, is not given in conventional frame-transfer CCDs. Here, the trigger signal 20 and the readout signal 21 may be effected independently of one another, in particular in a temporally asynchronous manner.

Using correspondingly more complex connections and switching mechanisms, the memory lines can also be used as random access memory in addition to the above-described FIFO principle (first in, first out). By way of example, the charges of the photo-line 10 can be shifted in a direct manner alternatively into one of the plurality of memory lines and/or these can be alternatively shifted into the readout structure. A corresponding memory management logic ensures that photo-charges are respectively stored in free memory lines (and that these are, where necessary, erased beforehand) and that a desired sequence is maintained during readout, for example the sequence of the triggering. This lends itself, in particular, if the memory structures 11 on the semiconductor are smaller than the photosensitive surface 10 and, accordingly, a plurality of memory cells have a space under one photocell.

In particular if, for example, the generation of photo charges is prevented (or reduced to a possible dark current) as a result of an aforementioned active illumination control, that is to say, for example, by switching off the illumination between the trigger events, a collection and overflow of photo-charges in the photo-element between two triggering events can be prevented. In this case, a differential evaluation similar to the CDS principle may contribute to improving the measurement values.

What is claimed is:

1. A position encoder, comprising a position code and an optical sensor element for acquiring at least part of the position code, wherein the sensor element comprises:
    a line of photosensitive acquisition regions, which convert incident photons (p) into electric charges; and
    a readout structure for outputting an electric data signal corresponding to the electric charges, wherein:
        the sensor element, for the purposes of temporarily storing the electric charges, comprises:
            an analog memory array structure with a number of N>1 lines of photo-insensitive analog memory cells, wherein the number of lines of memory cells is greater than a multiple of, the number of acquisition regions; and
            an electrical switching structure, by means of which switching structure a charge transfer is performable between the acquisition regions, the memory cells and the readout structure and which is configured in such a way that the charge transfer is in-between the lines of memory cells from one line to another line and is performable for individual lines or for a subset of the lines in the memory structure, wherein an upper part of the lines in the memory structure is shiftable independently of a lower part of the lines in the memory structure.

2. The position encoder as claimed in claim 1, wherein:
the switching structure is configured in such a way that:
   a trigger signal renders it possible to set a time of acquisition of the position code and of transferring the charges from the acquisition regions into the memory structure; and
   a readout signal asynchronous to the trigger signal renders it possible to set a time of the output by the readout structure.

3. The position encoder as claimed in claim 1, wherein:
the sensor element comprises:
   a single line of photosensitive acquisition regions;
   at least N≥3 lines of memory cells; and
   a single readout structure.

4. The position encoder as claimed in claim 1, wherein:
the switching structure renders possible performing the transfer of the electric charges:
   between the line of acquisition regions and one of the lines of analog memory cells at an acquisition time predetermined by the trigger signal;
   between the lines of analog memory cells amongst themselves, wherein the transfer is selectively actuatable for each one of these lines of memory cells or actuatable for a proper subset of the lines of memory cells;
   between at least one of the lines of analog memory cells and the readout structure, by the readout signal for reading out the position code acquired at the acquisition time; and
   wherein at least a second acquisition is performable between a first acquisition and completion of an associated first readout of the first acquisition, the charges of which second acquisition are temporarily stored in the memory structure in analog manner and which can be read out at a later time in an at least second readout following the first readout.

5. The position encoder as claimed in claim 1, wherein:
the sensor element comprises a discharge structure, which is configured in such a way that charges possibly present in one of the analog memory cells are discharged before there is a charge transfer into these memory cells, wherein the discharge structure is selectively applicable to a subset of the number N of lines of the analog memory structure.

6. The position encoder as claimed in claim 1, wherein:
the analog memory structure comprises a memory manager, which controls the charge transfer on the basis of a trigger signal and of a readout signal and which is configured in such a way that:
   on the basis of the readout signal, a transfer of the charges in the memory structure in the direction of the readout structure and the output of a data signal in the readout structure on the basis of the analog memory values take place; and
   on the basis of the trigger signal, it is possible to perform a transfer of the charges from the acquisition regions into a line in the memory structure, which lies closest to the readout structure and in which no charges are stored yet, wherein the output is effected asynchronously in relation to the trigger.

7. The position encoder as claimed in claim 1, wherein:
the sensor element is installed with a CCD with a CMOS structure on a common semiconductor substrate, wherein the analog memory structure is built in CCD technology and the readout structure is built in CMOS technology.

8. The position encoder as claimed in claim 1, wherein:
the sensor element is provided with a correlated double sampling structure.

9. The position encoder as claimed in claim 1, wherein:
the sensor element is provided with the correlated double sampling structure in that line of the analog memory structure from which the transfer into the readout structure is effected.

10. The position encoder as claimed in claim 1, wherein:
the line of acquisition regions comprises at least one dark pixel, which is protected against incident photons (p) and in which no charges are generated by photons and the charges of which are also transferred during a line-by-line transfer as a dark reference.

11. A method for optical acquisition of at least part of a position code by a line of photosensitive acquisition elements, comprising:
   an acquisition and conversion of photons into electric charges in the acquisition elements; and
   an output—triggered by a readout signal—of an electric data signal corresponding to the electric charges, wherein:
      triggering a time of the optical acquisition by an external trigger signal and, triggered thereby, transferring the electric charges from the acquisition elements into a memory structure configured as an array with N>1 lines of analog memory cells, wherein the number of lines in the memory structure is greater than the number of acquisition elements;
      temporary buffer storing of the analog charges in this memory structure prior to the output, during which the transfer in the memory structure to individual lines or to a subset of the lines in-between the lines of the memory structure is performed selectively, wherein an upper part of the lines in the memory structure is shiftable independently of a lower part of the lines in the memory structure; and
      wherein, as a result of the buffer storing, the acquisition can be effected asynchronously in relation to the output.

12. The method as claimed in claim 11, wherein:
a switching structure is used to perform;
caused by a trigger signal;
a transfer of charges from the line of photosensitive acquisition regions into one of the lines of the analog memory structure;
caused by a readout signal;
a transfer of charges from one of the lines in the analog memory structure into a readout structure;
the output of the electric data signal from the readout structure;
are performed; and
wherein the readout signal is controllable in a time-independent manner from the trigger signal.

13. The method as claimed in claim 11, wherein the transfer of charges from one of the lines in the analog memory structure into a readout structure includes an advance of at least those lines in the memory structure in which acquired charges are buffer stored.

14. The method as claimed in claim 11, wherein:
the memory structure is managed as line-by-line shift register, selective erasing of a subset of the lines in the memory structure is performable,
there is selective erasing of one of the lines prior to the transfer of charges into this line.

15. The method as claimed in claim 11, wherein:
depending on the trigger signal, the charges from the acquisition regions are either:
discharged in a discharge structure;
stored in the analog memory structure; or
wherein the charges in the memory structure are transferred into that unoccupied line lying closest to the readout structure.

16. The method as claimed in claim 11, wherein;
triggered by the trigger signal;
a transfer of previously collected parasitic charges from the acquisition regions into a first line in the memory structure, which is used as code information-free trash line (tr0, tr1, tr2, tr3), followed by:
an acquisition of photons for establishing the position code; and
a transfer of the acquired charges from the acquisition regions into a second line in the memory structure, which is used as measurement line with code information, wherein the charges in the trash line are transferred into a discharge structure for discharge and those in the measurement lines are transferred into the readout structure for output.

17. A non-transitory computer program product with program code stored on a machine-readable medium, configured as a hardwired programmable logic controller for performing the method as claimed in any one of claim 11.

18. A position encoder comprising a position code and an optical sensor element for acquiring at least part of the position code, wherein the sensor element comprises:
a line of photosensitive acquisition regions, which convert incident photons into electric charges;
a readout structure for outputting an electric data signal corresponding to the electric charges;
wherein:
the sensor element, for the purposes of temporarily storing the electric charges, comprises:
an analog memory structure configured as an array with a number of N>1 lines of photo-insensitive analog memory cells, wherein the number of lines of memory cells is greater than the number of acquisition regions; and
an electrical switching structure, by means of which switching structure a charge transfer is performable between the acquisition regions, the memory cells and the readout structure, wherein the charge can be transferred in-between the lines of memory cells from one memory line to another memory line.

19. The position encoder according to claim 18, wherein the number of lines of memory cells is greater than a multiple of the number of acquisition regions.

20. A method for optical acquisition of at least part of a position code by a line of photosensitive acquisition elements, comprising:
an acquisition and conversion of photons into electric charges in the acquisition elements;
an output—triggered by a readout signal—of an electric data signal corresponding to the electric charges;
characterized by;
triggered by a trigger signal, transferring the electric charges from the acquisition elements into a memory structure configured as an array with N>1 lines of analog memory cells, wherein the charge can be transferred in-between the lines of memory cells from one memory line to another memory line;
temporary buffer storing of the analog charges in this memory structure prior to the output; and
wherein, as a result of the buffer storing, the acquisition can be effected asynchronously in relation to the output.

21. A position encoder comprising a position code and an optical sensor element for acquiring at least part of the position code, wherein the sensor element comprises:
a line of photosensitive acquisition regions, which convert incident photons into electric charges;
a readout structure for outputting an electric data signal corresponding to the electric charges;
wherein:
the sensor element, for the purposes of temporarily storing the electric charges, comprises:
an analog memory structure configured as an array with a number of N>1 lines of photo-insensitive analog memory cells, wherein the number of lines of memory cells is greater than the number of acquisition regions; and
an electrical switching structure, by means of which switching structure a charge transfer is performable between the acquisition regions, the memory cells and the readout structure, wherein the charge can be transferred:
between the acquisition regions and the analog memory cells;
between the lines of memory cells from one memory line to another memory line; or
between the memory cells and readout structure.

* * * * *